Dec. 20, 1938.  C. E. LATSHAW  2,140,706
MIXING KNIFE
Filed May 12, 1937
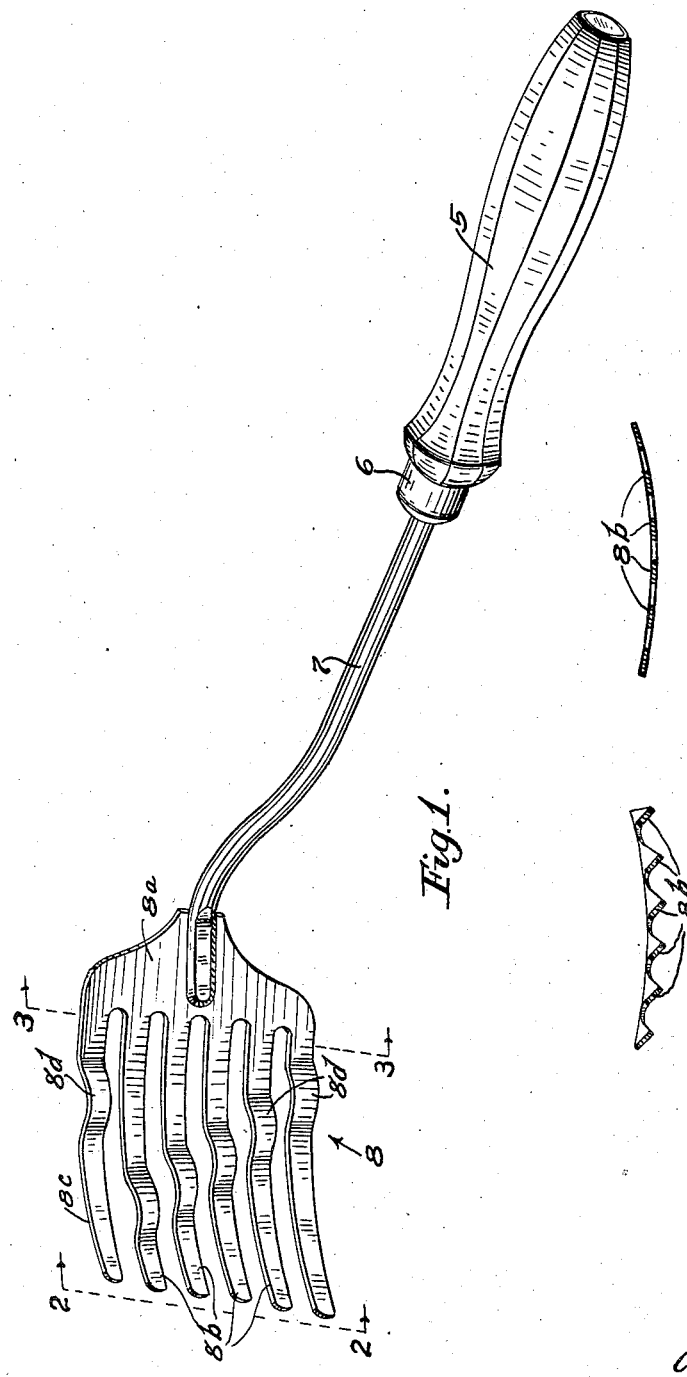
Inventor
CHARLES E. LATSHAW
By Chas. C. Reyf.
Attorney Patented Dec. 20, 1938

2,140,706

UNITED STATES PATENT OFFICE 2,140,706

MIXING KNIFE

Charles E. Latshaw, Minneapolis, Minn.

Application May 12, 1937, Serial No. 142,195

1 Claim. (Cl. 259—144)

This invention relates to a domestic hand utensil or a culinary implement adapted for mixing, cutting and serving various materials.

It is an object of this invention to provide a mixing knife or device of simple and efficient form, the same having a high degree of utility in the mixing of pie crust, biscuit, cake dough and other mixtures containing lard, flour and similar materials.

It is another object of the invention to provide a mixing knife or device of sanitary construction, one that is easily cleaned and free of recesses or other places for food materials to collect and become putrid.

It is a further object of the invention to provide a mixing knife or implement comprising a plurality of spaced blades of novel and efficient form for dividing and mixing batter and other materials through which said blades may pass.

It is still another object of the invention to provide a mixing knife or implement comprising a plurality of substantially parallel elongated blades of novel construction, the body of said device formed by said blades and the connecting head therefor being concave transversely as well as longitudinally of said implement.

It is more specifically an object of the invention to provide a mixing knife or implement comprising a plurality of spaced substantially parallel narrow blades, said blades being tapered somewhat toward their free ends and being of partial helical formation, the same being provided with curved portions or ripples arranged in a novel manner.

These and other objects and advantages of the invention will be fully set forth in the following description made in connection with the accompanying drawing in which like reference characters refer to similar parts throughout the several views and in which:—

Fig. 1 is a perspective view of the device;

Fig. 2 is a vertical section taken on line 2—2 of Fig. 1 as indicated by the arrows; and Fig. 3 is a vertical section taken on line 3—3 of Fig. 1 as indicated by the arrows.

Referring to the drawing, a device is shown comprising a handle 5 and while this handle might be made of various shapes, in the embodiment of the invention illustrated it is shown as somewhat octagonal in transverse cross section. A ferrule 6 is disposed at the inner end of handle 5 and a shank 7 of rod like form extends through ferrule 6 and is secured in handle 5. Member 7 is somewhat flattened at its end so as to have a substantially trapezoidal shape in cross section and the same fits against and is secured in any suitable manner, as by welding or riveting, to the head portion 8a of a knife or mixing portion 8. The head portion 8a is of curved outline at the side towards handle 5 to present a pleasing appearance and said head portion 8a is concave transversely on its upper side as indicated by Fig. 3. A plurality of blades 8b of substantially uniform width and length extend from head 8a, the spaces between said blades being substantially equal to the widths of said blades adjacent head portion 8a. The head portion 8a and the blades 8b are made of comparatively thin and strong plate-like material so that said blades have quite narrow or thin side edges 8c. These edges can cut through material having a certain softness or through liquid or semi-liquid material with a knife-like action. The blades 8b adjacent the head 8a lie in substantially the same plane as head 8a as shown in Fig. 3 and said blades then extend outwardly toward their free ends in helical formation so that at their outer ends the blades lie in diagonal parallel planes as clearly shown in Fig. 2. Each blade, therefore, is in the form of a partial helix or is twisted through substantially 45 degrees. The blades 8b also taper slightly toward their free ends as is clearly shown in Fig. 1. Each blade is also provided intermediate its ends with an upwardly curved portion 8d. While the number of blades might be varied, in the embodiment of the invention illustrated six blades are shown. The portion 8d on one outer blade is closely adjacent the head 8a and the curved portions 8d on the succeeding blades transversely of the device are successively farther from the head portion 8a so that the said portions 8d are alined in a direction extending diagonally across the blades to the last space between said blades. The blade at the other side of the device has its portion 8d adjacent the head portion 8a and spaced therefrom a distance slightly greater than the portion 8d of the blade at the opposite side of the device. The top surface of the blades and portion 8b is concave longitudinally of the blades so that the top surface of the device is concave both transversely and longitudinally.

The device can also be used to press fruits and vegetables through a sieve or colander. It saves time, labor and expense.

The device is capable of many uses in the household. It makes an admirable device for mixing various kinds of dough and is quite efficient in mixing lard with flour and other ingredients. If the lard or other shortening material is somewhat stiff due to a low temperature the same can be effectively divided and mixed with the flour by the use of the diagonally disposed blades. The same can be mixed without the operator's hands touching the mixture.

The device forms a very efficient stirrer for liquids, such as gravy, and the concavo-convex form of the device enables it to conveniently fit the curved sides of pans, crocks and dishes. Due to the blade and head-portion of the device being concave longitudinally on its upper surface the underside of the blades 8b are thus convex. The blades also have the helical formation so that the corners formed by the lower surface and side edges act as scrapers for the bottom of a curved pan in which the material is being cooked. When such material is being stirred these corners act as edges to scrape the material from the bottom of the pan so that it will not be scorched. The material is thus not pressed down against the bottom of the pan as it would be with a spoon or other solid implement.

In mixing a liquid or semi-liquid material the device is moved through the same with a motion making substantially on ellipse in a vertical plane and the material is cut into successive layers by the edges of the blades 8b as they pass through the mixture transversely of the device. Each of these layers or strata will be divided longitudinally by the portions 8d as the device moves through the material, so that there will be quite a fine division of the material and thus a very efficient mixing. The portions 8d being distributed longitudinally of the device the division of the layers is sure to be made. The device thus forms a very efficient aerator when mixing cake batter or other batters in which baking powder is used. This aerator effect is increased by the rippled construction of the blades. The device can also be used as an efficient mixer for mashed potatoes, rutabagas and other vegetables which are mashed and mixed or beaten. The rectangular sides of the blades form cutting edges which cut through the mashed vegetable.

The device is also very useful in lifting potatoes, meat or other articles from liquid, as the liquid will drain readily between the blades. Many things can be served conveniently with the device.

The shank portion 7 is made from stainless steel wire or other non-corrosive material and such material can be used for the head 8a and blades 8b. The handle is firmly secured so that the blade portion cannot turn when the device is in use.

From the above description it is seen that applicant has provided a very simple and efficient mixing knife or implement and one which can be easily and inexpensively produced. The device is pleasing in appearance and has a high degree of utility. The same has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claim.

What is claimed is:—

A cutting and mixing device comprising a head portion, and a plurality of narrow spaced blades extending from said head portion and having free ends, said blades each being provided with an upwardly curved portion forming a ripple, said ripple on one outer blade being closely adjacent said portion and said ripples on each of the successively adjacent blades, save the other outer blade, partially overlapping each other and being successively nearer to the free ends thereof, all of said ripples being disposed above a plane defined by the lower non-rippled longitudinal edges of said blades.

CHARLES E. LATSHAW.